United States Patent
Hogan

(10) Patent No.: US 6,513,271 B2
(45) Date of Patent: Feb. 4, 2003

(54) TAMPER-PROOF ANIMAL IDENTIFICATION TAG

(75) Inventor: Thomas Hogan, Marietta, GA (US)

(73) Assignee: VeriLogik, Inc., Powder Springs, GA (US)

( * ) Notice: Subject to any disclaimer, the term of this patent is extended or adjusted under 35 U.S.C. 154(b) by 0 days.

(21) Appl. No.: 09/832,385

(22) Filed: Apr. 11, 2001

(65) Prior Publication Data

US 2002/0148146 A1 Oct. 17, 2002

(51) Int. Cl.[7] .................................................. G09F 3/00
(52) U.S. Cl. ........................................ 40/301; 340/573.1
(58) Field of Search .......................... 40/300, 301, 668; 340/572.7, 573.1; 343/788; 119/859

(56) References Cited

U.S. PATENT DOCUMENTS

| 3,399,478 A | * | 9/1968 | Tarver | 40/300 |
|---|---|---|---|---|
| 4,718,374 A | * | 1/1988 | Hayes | 40/301 X |
| 4,847,592 A | * | 7/1989 | Hogen Esch et al. | 340/572.8 |
| 5,588,234 A | * | 12/1996 | de Jong et al. | 40/301 |
| 5,768,813 A | * | 6/1998 | Reboul et al. | 40/301 |
| 6,323,771 B1 | * | 11/2000 | Payne et al. | 340/573.1 |

* cited by examiner

Primary Examiner—Brian K. Green
(74) Attorney, Agent, or Firm—Troutman Sanders LLP; Wm. Brook Lafferty

(57) ABSTRACT

A tamper-proof electronic animal identification tag comprising an antenna card carrying an antenna and a stud carrying a data transmission chip is disclosed. The stud is unidirectionally flexible, and can only be inserted into the antenna card one time and in one direction. Insertion of the stud into the antenna card creates an electrical contact between the data transmission chip and the antenna, extending the communicative range of the data transmission chip.

6 Claims, 3 Drawing Sheets

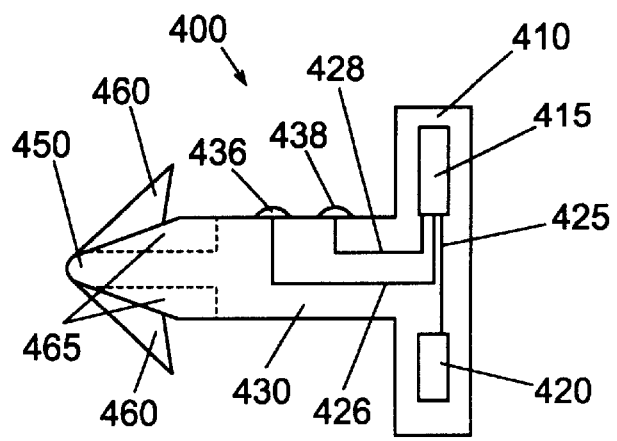
*Fig. 4a*
*Fig. 4b*
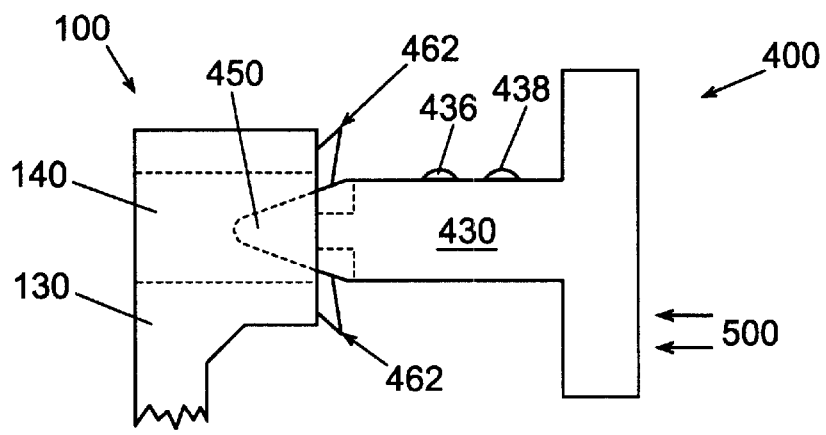
*Fig. 5*
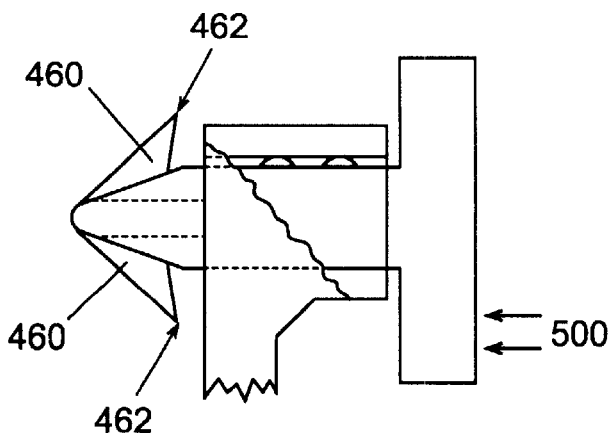
*Fig. 6*

TAMPER-PROOF ANIMAL IDENTIFICATION TAG

TECHNICAL FIELD

The present invention relates animal identification tags. More specifically, the present invention relates to electronic animal identification tags that are resistant to tampering.

BACKGROUND

The ability of a rancher to identify an individual animal within his herd has always been important. The ear tag has long been the preferred device for identifying individual animals.

Conventional ear tags are usually plastic, with an alphanumeric number stamped or printed on the tag in a conspicuous manner. The tags are typically attached to the ear of each animal by clipping or otherwise permanently securing the tag so that it remains attached to the animal during its life. Animal movement, health, weight, and other characteristics are thereby tracked by the number associated with the animal via the ear tag.

As worldwide concerns regarding food safety and the proper administration of medicines to food animals have grown, so has the technology to verify the health and medical histories of individual animals. For example, U.S. Pat. No. 5,961,494, to Hogan is directed to an animal syringe which automatically places a mark of ink on an animal proximal to the location of an injection. This invention prevents accidental over-vaccination of animals and makes it easier to verify that (a) the animals have received the necessary injections, and (b) the injections were given in the proper part of the anatomy.

A significant expansion of the marking syringe technology is currently commercially available as the Vac-Trac Verification System ("VTVS"), marketed by AgEcom, Inc., of Marietta, Ga. The VTVS (pending U.S. patent application Ser. No. 09/477,262) teaches a marking syringe having the ability to—upon actuation—automatically read and record the identity of the animal receiving the injection. The VTVS utilized a receiver to read the unique signal transmitted by a transmitter incorporated into the ear tag on the injected animal. The identity of the animal and the occurrence of the injection are then transferred to a computerized database for review, analysis and verification purposes, among others.

Despite these quantum advances in tools for verifying important information relating to the production of food animals, an unscrupulous rancher may still find ways to circumvent these systems and detrimentally effect the integrity of the data and the wholesomeness of the animals. One such avenue of potential circumvention relates to re-use or misuse of the electronic ear tag. If a rancher can remove an ear tag and attach it to another animal, the validity of the data is compromised.

Accordingly, there is a need for an animal identification tag ("AIT") that is resistant to misuse.

There is a further need for an AIT that will, upon an attempt at misuse, have more than one failure aspect to prevent successful misuse.

There is yet another need for an AIT possessing the above-desired characteristics that demonstrates improved performance in the transmission of animal identification data.

BRIEF SUMMARY OF THE INVENTION

These and other shortcomings relating to electronic animal identification are satisfied by the present invention. The present invention is a tamper-proof electronic animal identification tag comprising an antenna card carrying an antenna and a stud carrying a data transmission chip.

The antenna card defines an opening therethrough have at least one antenna contact connected to the antenna. The stud has a stud body, a stud head, and a stud shaft. The stud body carries a data transmission chip electrically connected to antenna contact points.

Importantly, the stud head is unidirectionally flexible to allow a single insertion of the stud head through the opening in the antenna card. The single insertion of the stud aligns and electrically connects the antenna to the data transmission chip and prevents the stud head from being removed from the antenna card.

BRIEF DESCRIPTION OF THE DRAWINGS

FIG. 4a depicts the stud of an exemplary embodiment of the present invention.

FIG. 4b depicts an end view of the stud of the exemplary embodiment of the present invention depicted in FIG. 4a.

FIG. 5 depicts a representative partial insertion of the stud into the opening of the antenna card, in accordance with an exemplary embodiment of the present invention.

FIG. 6 depicts a full insertion of the stud through the opening of the antenna card, in accordance with an exemplary embodiment of the present invention.

DETAILED DESCRIPTION OF EXEMPLARY EMBODIMENTS

Figure 1:
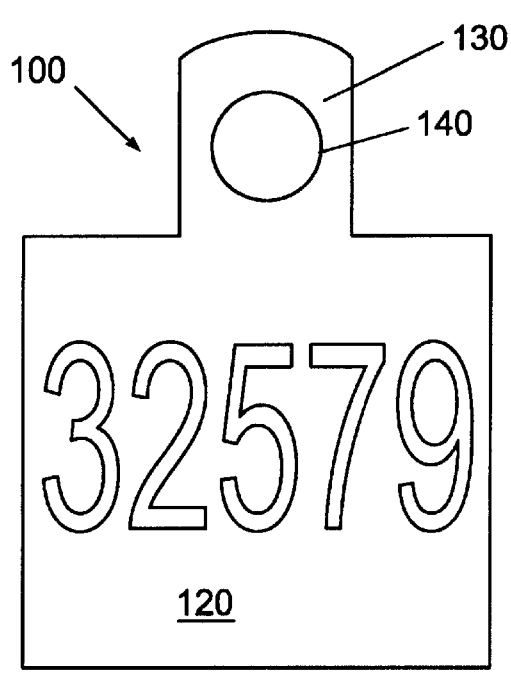
FIG. 1 depicts an exemplary embodiment of the antenna card portion of the present invention.

FIG. 1 depicts an embodiment of the antenna card portion of the animal identification tag. The antenna card 100 is, generally, a planar portion 120 and an antenna card tab 130, the antenna card tab defining through its thickness an opening 140.

The antenna card 100 is ideally formed of any one of a wide variety of corrosion-resistant plastics. Materials from the plastics family are especially well suited for this application because of their light weight, low cost of production, and the ability to house certain items within the plastic device, such as will be later described with reference to FIG. 2. Importantly, a plastic antenna card is particularly amenable to being formed in any one of a wide variety of different colors, as may be used to identify different groups of animals to which they may be attached. For example, it may be advantageous to use blue antenna cards for male animals and pink antenna cards to identify female animals. Furthermore, an identification number can be easily stamped onto or printed on the planar portion 120 of the antenna card 100, allowing manual visual identification of the animal.

In an optional embodiment of the present invention, a solar panel may be attached or otherwise incorporated onto the planar surface 120, providing a power source for the processor, which will be later-described.

Figure 2:
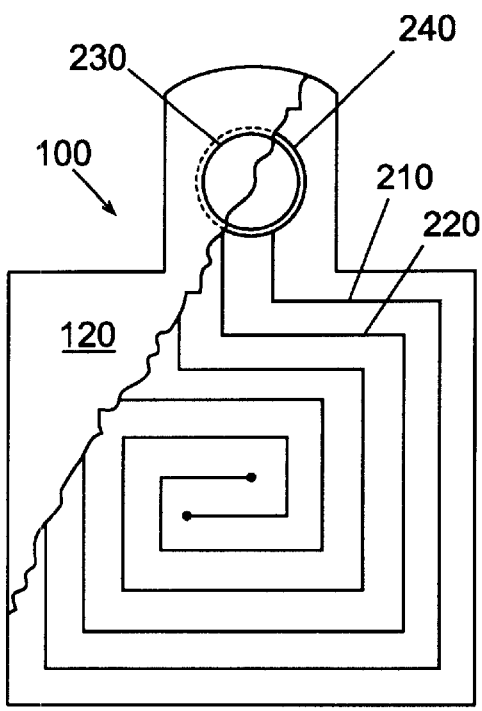
FIG. 2 depicts a cut-away view of the internal configuration of an exemplary embodiment of the antenna card depicted in FIG. 1.
Figure 7:
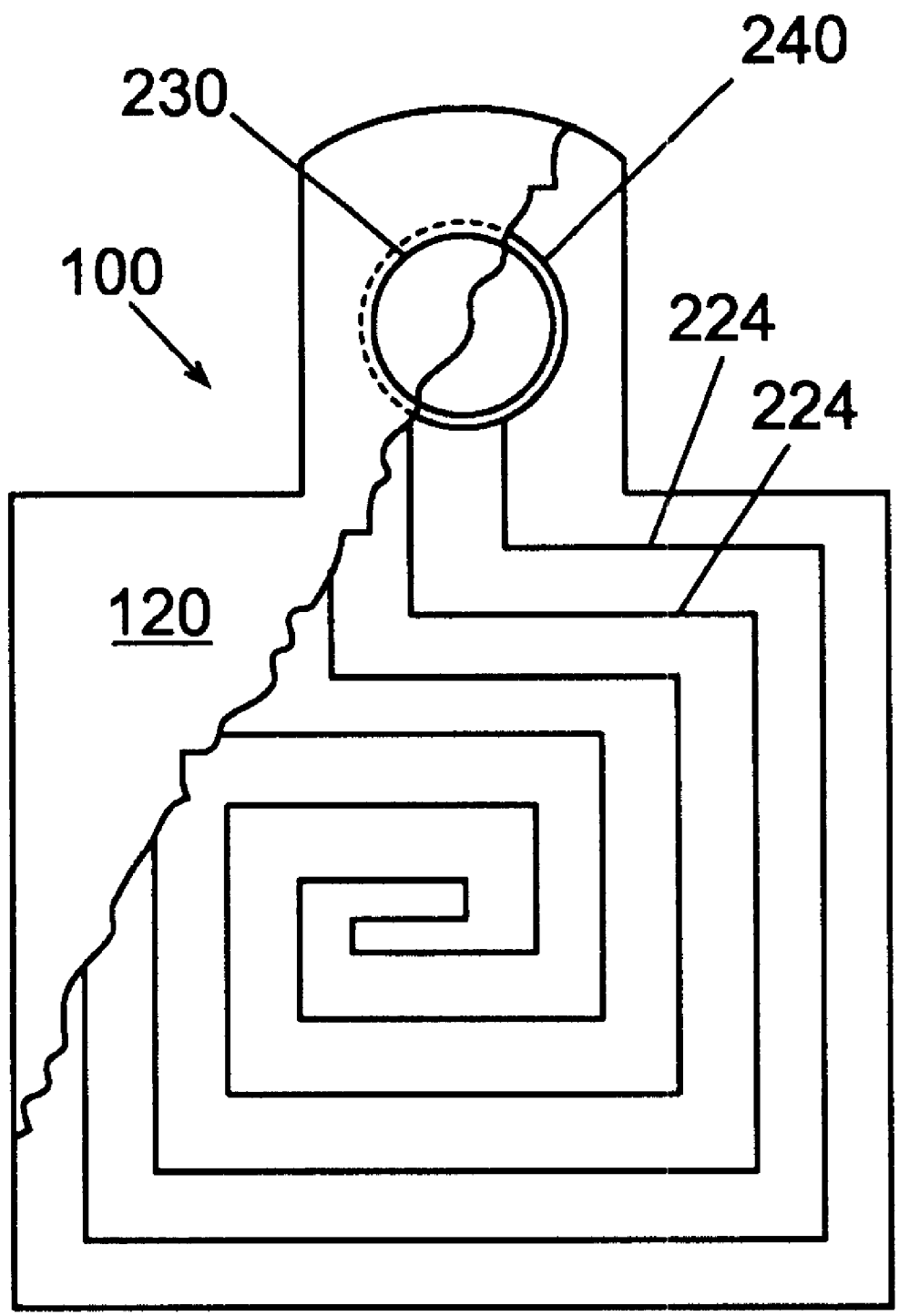
FIG. 7 depicts a cut-away view of the internal configuration of an alternative embodiment of the present invention utilizing a unipolar antenna.

FIG. 2 is a cut-away view of the antenna card 100. This cut-away view exposes the antenna internal to the antenna card 100. In the depicted embodiment of FIG. 2, a 2-pole antenna is shown. The first antenna pole 210 and the second antenna pole 220 are arranged in a manner so as to provide optimal transmission and signal receiving capability. In the depicted embodiment of FIG. 2, the antenna poles 210 and 220 are coiled, though it is well understood to those skilled in the art of antenna design that the antenna can be arranged in any variety of ways to facilitate transmission results. In an alternative embodiment, a unipolar antenna with antenna pole 224 may be used as shown in FIG. 7. Similarly, it will be understood and appreciated that the antenna may exist, in an alternate embodiment, without the antenna card 100.

Each of the antenna poles 210 and 220 are encased within the thickness of the planar portion 120 of the antenna card 100, with the exception of a single antenna contact for each pole. The first antenna pole 210 is connected to a first antenna contact 230 and the second antenna pole 220 is connected to the second antenna contact 240. In a preferred embodiment, the antenna contacts 230 and 240 are electrically conductive rings positioned around the inner periphery of the opening 140 defined by the antenna card tab 130. The antenna contacts 230 and 240 are affixed to the antenna card tab 130 in a secure manner. In an optional embodiment of the present invention, the antenna contacts 230 and 240 may not provide exposed electrical contact about the entire periphery of the opening 140, but may only be exposed at a portion of the periphery.

Figure 3A:
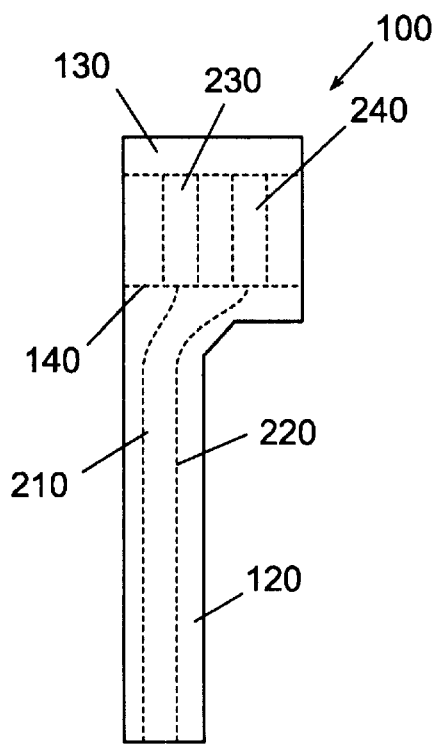
FIG. 3a depicts a side view of the antenna card of an exemplary embodiment of the present invention.

FIG. 3a depicts a side profile view of the antenna card 100. The antenna card 100 comprises a planar portion 120 and an integrally formed antenna card tab 130. In the depicted embodiment, the antenna card tab 130 is substantially thicker than the planar portion 120 so that it can accommodate the stud (not shown) and the first antenna contact 230 and second antenna contact 240. The first antenna contact 230 is located, as previously described, within the opening 140, and is electrically connected to the first antenna pole 210. The second antenna contact 230 is also positioned within the opening 140, and is similarly electrically connected to the second antenna pole 220.

Figure 3B:
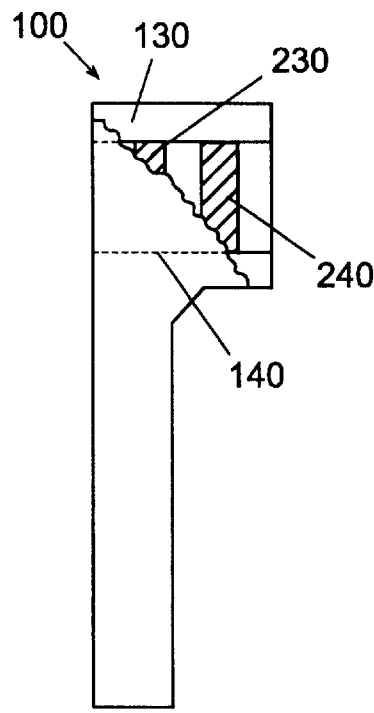
FIG. 3b depicts a cut-away side view of the antenna card of an exemplary embodiment of the present invention.

FIG. 3b shows a cut-away view of the antenna card tab 130, illustrating the first antenna contact 230 and the second antenna contact 240 within the opening 140.

Turning now to FIG. 4a, a representative preferred embodiment of the stud 400 of the animal identification tag is depicted. The stud 400 comprises, generally, a stud body 410, stud shaft 430 and a stud head 450. The physical composition of the stud 400 is the same as the antenna card 100, for the same reasons of weight, ease of production and durability.

In the preferred embodiment, the stud 400 carries a data transmission chip 415. The functionality of the data transmission chip 415 can vary widely, but in the preferred embodiment, it is functional to store a unique code which identifies an individual animal, and to transmit that unique code either continuously or upon excitation by an external stimulus. The data transmission chip may be powered by a power source 420 such as a battery. The power source 420 is connected to the data transmission chip 415 by a power lead 425. Alternately, power for the chip 415 may be provided by an external source, such as solar power, with the solar panels being affixed in a well known manner to the antenna card 100. Furthermore, the data transmission chip 415 may be a passive device that receives energy from an externally transmitted signal received by the antenna poles within the antenna card 100, and transmits a responsive signal with energy derived from the received signal.

Importantly, a first linear antenna lead 426 and a second linear antenna lead 428 are electrically connected to the data transmission chip 415. The linear antenna leads 426 and 428 pass from the data transmission chip 415 through the stud body 410 and into the stud shaft 430 where they are electrically connected to a first antenna contact point 436 and a second antenna contact point 438, respectively. The antenna contact points 436 and 438 are a critical aspect of the present invention in that they provide the electrical link between the stud 400 having the data transmission chip 415 and the antenna card 100 having the antenna poles 210 and 220. Accordingly, the antenna contact points 436 and 438 are sized so that, upon insertion of the stud 400 into the opening 140 of the antenna card tab 130, each antenna contact point will make sufficient contact with its respective antenna contact 230 and 240 to allow the transmission of electrical signals between the antenna poles 210 and 220 and the data transmission chip 415. Additionally, the antenna contact points 436 and 438 should consist or be coated with any of a variety of materials well known to those skilled in the art of electrical conductors to be both highly conductive and corrosion resistant.

The stud head 450 includes functionality important to the tamper-proof aspect of the present invention. Namely, the stud head 450 includes catch wings 460. The catch wings may take any of a wide variety of shapes or configurations, but they function to allow the stud head 450 to pass unidirectionally into and through an opening such as opening 140 and the, once it has passed unidirectionally through the opening, the catch wings prevent the stud head 450 from passing back through the opening in the opposite direction.

In the depicted embodiment, the catch wings 460 are initially biased in an expanded position. Those skilled in the art of mechanical catches and latches are well familiar with biasing techniques for such catches. One such suitable biasing technique is to fixably position a spring between an individual catch wing 460 and the interior of the stud head 450 so that the desired biasing effect is accomplished. In any event, the initial state of the stud head 450 finds the catch wings 460 biased in a open position.

FIG. 4b is an end view of the stud 400 depicting an animal identification number corresponding to the animal identification number marked on the antenna card 100 and earlier discussed with regard to FIG. 1. These corresponding animal identification numbers on the two pieces of the animal identification tag provide a means to manually verify that the antenna card 100 and the stud 400 are used as intended.

FIG. 5 indicates the stud 400 being inserted into the opening 140 within the antenna card tab 130 of the antenna card 100. As the stud head 450 of the stud 400 is inserted in the direction indicated by directional arrow 500 relative to the antenna card 100, the distance between opposing points on the catch wings 460 exceeds the diameter of the opening 140. Continued force in direction 500 urges catch wings into wing recesses 465 (see FIG. 4). As pressure in direction 500 continues, catch wings 460 recede substantially entirely into wing recesses 465 and the shaft head 450 passes through the opening 140.

FIG. 6 depicts the state of the stud head 450 and the catch wings 460 after the stud head 450 has passed completely through the opening 140. As the catch wing tips 462 clear the opening 140, and the closure force exerted upon them by the inner periphery of the opening 140 ceases, the catch wings 460 are returned to their expanded position, as illustrated in FIG. 4a. Once expanded, the catch wings 462—and in particular the catch wing tips 462—make contact with the antenna card tab 130, preventing the stud head 450 from returning back through the opening in a direction opposite direction 500.

Also illustrated in FIG. 6 is the electrical connection between first antenna contact 230 and first antenna contact point 436, as well as the electrical connection between second antenna contact 240 and second antenna contact point 438. The respective antenna contacts 230 and 240 are positioned such that complete insertion of the stud 400 into the antenna card 100 is required for electrical contact with their respective antenna contact points 436 and 438.

I claim:

1. A tamper-proof electronic animal identification tag, comprising:
    an antenna; and
        a stud having a stud body and a stud head terminating opposing ends of a generally cylindrical stud shaft, the stud shaft being smaller in diameter than the stud body, the stud body carrying a data transmission chip electrically connected to a first end of a linear antenna lead, the linear antenna lead having a second end terminating at a point on the exterior of the stud shaft between the stud body and the stud head; whereby
        the stud head is unidirectionally flexible to allow a one-time attachment of the stud head of the stud to the antenna, whereby the one-time attachment aligns and electrically connects the antenna lead to the antenna.

2. The tamper-proof animal identification tag of claim 1, wherein the antenna is a bipolar antenna.

3. The tamper-proof animal identification tag of claim 1, wherein the antenna is a unipolar antenna.

4. A tamper-proof electronic animal identification tag, comprising:
    an antenna card carrying an antenna, the antenna card defining a periphery of a generally tubular opening through the antenna card, the periphery carrying thereon an antenna contact connected to the antenna; and
    a stud having a generally cylindrical stud shaft having a first and a second shaft end, the first shaft end terminated by a stud body, the second shaft end terminated by a stud head, the stud shaft being smaller in diameter than the stud body, the stud body carrying a data transmission chip electrically connected to a first end of a linear antenna lead, the linear antenna lead having a second end terminating at a point on the exterior of the stud shaft between the stud body and the stud head; whereby
        the stud head is unidirectionally flexible to allow a single insertion of the stud head of the stud through the opening defined by the periphery of the antenna card and whereby the single insertion aligns and electrically connects the antenna lead to the antenna via the antenna contact.

5. The tamper-proof animal identification tag of claim 4, wherein the antenna is a bipolar antenna.

6. The tamper-proof animal identification tag of claim 4, wherein the antenna is a unipolar antenna.

* * * * *